United States Patent Office 2,711,969
Patented June 28, 1955

2,711,969

METHOD OF TREATING SHEET SPONGE RUBBER

Albert H. Abig, Norwalk, Conn., assignor to United States Rubber Company, New York, N. Y., a corporation of New Jersey No Drawing. Application February 25, 1954,
Serial No. 412,625

13 Claims. (Cl. 117—4)

This invention relates to improving the cutting properties of sheet sponge rubber made from frothed latex.

It is well known to prepare a latex froth by whipping air into a compounded latex or by mixing a compounded latex with a previously prepared foam, shaping the froth in sheet form on a spreader or in flat molds, gelling the shaped froth, and vulcanizing the gelled froth to form so-called frothed or foam sponge rubber. The sponge rubber is then washed with water to dissolve out residual compounding and other water-soluble ingredients, squeezed to express excess water, and dried. When manually cutting sheet sponge for making assembled cushions, as in U. S. Patent 2,619,659, or when die-cutting small shapes that are to be used as such or to be used as parts in further processing, as in making assembled articles, the cut edges on the opposite faces of the cut sponge part have a tendency to remain squeezed together or compressed after release of the cutting instrument which deforms the cut part at the cut edges and spoils the appearance of the same where it is to be used as such, e. g., as a powder puff, and which often offers problems in manufacture where the part is to be further processed in making assembled articles.

I have found that the cut edges of frothed rubber latex sheet sponge spring back after cutting and do not remain squeezed together or compressed if the sponge is treated with a polyalkylene glycol, or an ester of a polyalkylene glycol and an aliphatic acid, or an ether of a polyalkylene glycol and an aliphatic alcohol, or an ether of a polyalkylene glycol and an alkylphenol.

In carrying out the present invention, the frothed latex sponge is impregnated with an aqueous solution or dispersion of the polyalkylene glycol or polyalkylene glycol ester or ether, as by washing the sponge with the aqueous dispersion of the treating material and squeezing out the excess solution or dispersion, and drying. The sponge is generally impregnated with the aqueous solution or dispersion of the treating material after the conventional washing of the vulcanized sponge with water and before drying.

The finished dried sponge will generally contain from 0.5% to 10%, and preferably from 1% to 5%, by weight of the treating material to give the improvement of the present invention. The amount of treating solution or dispersion entrained in the rubber sponge after squeezing out the excess may be from 25% to 100% of the dry sponge weight and the concentration of treating material in the aqueous solution or dispersion may be in the range of 2% to 25%, the concentration of the treating solution and the amount entrained in any particular case depending, of course, on the amount of treating material desired in the specific sponge product. The process of the present invention is applicable to batch and continuous foam latex sponge operations.

The polyalkylene glycols and esters and ethers thereof used as treating materials in the present invention are known materials. The polyalkylene glycols may be polyethylene glycols or polypropylene glycols or mixed polyethylene-polypropylene glycols having 4 to 200 alkyleneoxy groups in the polymer chain. Commercially available polyalkylene glycols are mixtures of several condensation polymers. For example, a commercial polyethylene glycol having an average molecular weight of 400 which calculates to an average of eight and one-half ethyleneoxy groups in the polymer chain, actually has a distribution of polyethylene glycols in terms of weight percent of each molecular size as follows: 2% tetraethylene glycol, 4% pentaethylene glycol, 6% hexaethylene glycol, 10% heptaethylene glycol, 13% octaethylene glycol, 14% nonaethylene glycol, 14% decaethylene glycol, 12% hendecaethylene glycol, 10% dodecaethylene glycol, 7% tridecaethylene glycol, 5% tetradecaethylene glycol and 3% pentadecaethylene glycol. The polyalkylene glycol esters may be the condensation products of such polyalkylene glycols and aliphatic acids having 5 to 18 carbon atoms in the acyl group. The polyalkylene glycol ethers may be the condensation products of such polyalkylene glycols and aliphatic alcohols having 5 to 18 carbon atoms in the aliphatic group, or condensation products of such polyalkylene glycols and alkylphenols having 8 to 18 carbon atoms in the alkyl group. Generically the polyalkylene glycols and esters and ethers thereof that are used in the present invention may be said to have the structural formula $R(OC_nH_{2n})_mOH$ where R represents hydrogen, or an aliphatic radical having 5 to 18 carbon atoms, or an acyl radical having 5 to 18 carbon atoms derived from an aliphatic acid, or an alkaryl radical having 8 to 18 carbon atoms in the alkyl group, and $n$ is 2 or 3, and $m$ is 4 to 200.

The invention is illustrated below, all parts and percentages referred to herein being by weight:

A rubber latex was conventionally compounded for foam sponge manufacture according to the following recipe, the various compounding ingredients being added in the form of aqueous solutions or suspensions of the concentration indicated:

| Ingredients | Parts Wet Weight | Percent Solids |
|---|---|---|
| Rubber Latex | 155.0 | 64.5 |
| Potassium Oleate Soap | 10.0 | 20.0 |
| Potassium Hydroxide | 2.0 | 10.0 |
| Accelerator (Zinc diethyl dithiocarbamate) | 1.8 | 45.0 |
| Accelerator (Zinc salt of 2-mercaptobenzothiazole) | 3.2 | 40.0 |
| Zinc Oxide | 8.0 | 60.0 |
| Sulfur | 3.5 | 60.0 |
| Sensitizer (Trimene Base) | 2.0 | 50.0 |
| Antioxidant (Phenolic type) | 3.5 | 45.0 |

The rubber latex, which was a natural rubber latex compounded according to the above recipe, was whipped to a wet froth density of 100 grams per liter. Eight parts on a wet basis of a 25% sodium silicofluoride slurry (gelling agent) was thoroughly mixed into the froth and the froth was poured into a flat pan mold to a height to give a finished sponge sheet of about ½" thickness, and permitted to gel at room temperature. After the foam had gelled, the mold was heated at 210° F. for 30 minutes to cure or vulcanize the gelled foam to sponge rubber. After curing, the sponge rubber was washed in a conventional manner by passing through a series of wringer rolls which squeezed water out of the sponge, and between these wringer rolls fresh water was constantly sprayed on the sponge rubber. After washing, portions of the sponge rubber were treated according to the present invention as by submerging a wringer in aqueous solutions or dispersions of the treating materials of the present invention, and immersing the sponge portions and passing them through the submerged wringer. The sponge portions were removed from the treating baths and passed through a wringer to reduce the content of treating solution to about 30 to 50% based on the dry sponge weight, and were dried to substantially complete dryness in 30 minutes at 220° F. using forced air. The specific treatment of the various sponge portions are shown in the table below:

| Treating Material | Concentration of Treating Solution (Percent) | Treating Solution Entrained in Wet Sponge (Approx. Percent Based on Dry Sponge Weight) | Treating Material in Finished Sponge (Percent Based on Finished Sponge Weight) |
| --- | --- | --- | --- |
| Polyethylene glycol having an ave. mol. wt. about 4,000 | 12 | 39 | 4.5 |
| Monolaurate ester of a polyethylene glycol having an ave. mol. wt. about 400 | 10 | 46.5 | 4.6 |
| Ether of nonyl alcohol and a polyethylene glycol having an ave. mol. wt. about 500 | 10 | 44.0 | 4.4 |
| Polypropylene glycol having an ave. mol. wt. about 660 | 10 | 32.0 | 3.2 |
| Ether of oleyl alcohol and a polyethylene glycol having an ave. mol. wt. about 900 | 10 | 34.6 | 3.4 |

The control sponge portion which was not treated with the treating material of the present invention after washing with water and the various sponge portions that were treated with various treating materials according to the present invention, were die cut with a conventional die for making sponge powder puffs. The edges of the powder puff made from the control sponge portions remained squeezed together or collapsed, whereas the powder puffs made from all the sponge portions treated according to the present invention sprang back after the die cutting operation, giving a thickness around the edge the same as throughout the body of the sponge. The sheet sponge rubber made in a flat pan mold as illustrated above, is called "flat stock" and is generally made in thicknesses from ¼" to ½". The sheet sponge rubber which may be treated according to the present invention may also be cored from one or both sides, such cored sheet stock being generally from 1" to 5" thick. Such flat stock and single and double cored stock are shown in U. S. Patent 2,619,659. Polyalkylene glycols and esters and ethers thereof have been used to prepare dispersions of compounding ingredients for addition to latex including latex foam compounds and polyalkylene glycols have been used as mold release agents on the surface of molds in sponge manufacture, but these materials are substantially all washed out in the conventional washing of the foam sponge, and in any case, would in no way amount to the 0.5 to 10 parts by weight of the dry foam sponge remaining in the finished sponge to give the improvement of the present invention.

The cured latex foam sponge need not be washed with water before treatment with the aqueous solution or dispersion of the treating material of the present invention. If desired, the sponge may be dried, with or without washing in water, before being treated according to the present invention. This would generally only be the case where a very small portion of a sponge run was to be treated according to the present invention. The latex compound may be frothed by chemical means, as by evolving a gas such as oxygen in the latex by decomposition of hydrogen peroxide, instead of mechanically whipping air into the latex. The gelling agent may be added to the latex before foaming, or mixed into the foam before pouring, as in the above examples, or the shaped foam without admixture with a gelling agent may be coagulated or gelled by means of a coagulant gas or by freezing, or the foam may be frozen without coagulation and then the uncoagulated frozen foam may be coagulated by means of a coagulating gas. These are known variations in frothed latex sponge manufacture. The latex for preparing sponge rubber according to the present invention may be a natural rubber latex, or a conjugated diene polymer synthetic rubber latex, or mixtures of any of the same. Such conjugated diene polymer synthetic rubber latex may be an aqueous emulsion polymerizate of one or a mixture of butadienes-1,3, for example, butadiene-1,3, 2-methyl-butadiene-1,3 (isoprene), 2-chlorobutadiene-1,3 (chloroprene), piperylene, 2,3-dimethyl butadiene-1,3. The conjugated diene polymer synthetic rubber latex, as known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadiene-1,3 are aryl olefins, such as styrene, vinyl toluene, vinyl naphthalene, alpha methyl styrene, parachloro styrene, dichloro styrene, alpha methyl dichloro styrene; the alpha methylene carboxylic acids, and their esters, nitriles and amides, such as acrylic acid, methyl acrylate, methyl methacrylate, acrylonitrile, methacrylonitrile, methacylamide; methyl vinyl ether; methyl vinyl ketone; vinylidene chloride; vinyl pyridine, 2-methyl-5-vinyl pyridine; vinyl carbazole.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method which comprises impregnating a soft, resilient rubber sponge prepared from a frothed rubber latex selected from the group consisting of natural rubber latex and latex of a conjugated diene polymer synthetic rubber, which synthetic rubber contains at least 30% of such polymerized conjugated diene, with 2% to 25% concentration in an aqueous medium of material selected from the group consisting of polyalkylene glycols, esters of polyalkylene glycols and aliphatic acids, ethers of polyalkylene glycols and aliphatic alcohols, and ethers of polyalkylene glycols and alkylphenols, having 4 to 200 alkyleneoxy groups in the polymer chain, squeezing the thus treated sponge to an entrainment of the aqueous treating solution of 25% to 100% based on the dry sponge weight, drying the thus treated sponge, and cutting said sponge.

2. The method of claim 1 in which the treating material is polyethylene glycol.

3. The method of claim 1 in which the treating material is polypropylene glycol.

4. The method of claim 1 in which the treating material is an ester of polyethylene glycol and an aliphatic acid having 5 to 18 carbon atoms in the acyl group.

5. The method of claim 1 in which the treating material is an ether of polyethylene glycol and an aliphatic alcohol having 5 to 18 carbon atoms in the aliphatic group.

6. The method of claim 1 in which the treating material is an ether of polyethylene glycol and an alkylphenol having 8 to 18 carbon atoms in the alkyl group.

7. The method of improving the cutting properties of soft, resilient sponge rubber sheet prepared from a frothed rubber latex selected from the group consisting of natural rubber latex and latex of a conjugated diene polymer synthetic rubber, which synthetic rubber contains at least 30% of such polymerized conjugated diene, which comprises impregnating the sponge sheet with a 2% to 25% concentration in an aqueous medium of material selected from the group consisting of polyalkylene glycols, esters of polyalkylene glycols and aliphatic acids, ethers of polyalkylene glycols and aliphatic alcohols, and ethers of polyalkylane glycols and alkylphenols, having 4 to 200 alkyleneoxy groups in the polymer chain, squeezing the thus treated sponge to an entrainment of the aqueous treating solution of 25% to 100% based on the dry sponge weight, and drying the thus treated material.

8. The method of improving the cutting properties of soft, resilient sponge rubber sheet prepared from a frothed rubber latex selected from the group consisting of natural rubber latex and latex of a conjugated diene polymer synthetic rubber, which synthetic rubber contains at least 30% of such polymerized conjugated diene, which comprises impregnating the sponge sheet with a 2% to 25% concentration in an aqueous medium of material selected from the group consisting of polyalkylene glycols, esters of polyalkylene glycols and aliphatic acids, ethers of polyalkylene glycols and aliphatic alcohols, and ethers of polyalkylene glycols and alkylphenols, having 4 to 200 alkyleneoxy groups in the polymer chain, squeezing the thus treated sponge to an entrainment of the aqueous treating solution of 25% to 100% based on the dry sponge weight, and drying the thus treated material, the finished dried sponge containing 0.5% to 10% by weight of the treating material.

9. The method of claim 8 in which the treating material is polyethylene glycol.

10. The method of claim 8 in which the treating material is polypropylene glycol.

11. The method of claim 8 in which the treating material is an ester of polyethylene glycol and an aliphatic acid having 5 to 18 carbon atoms in the acyl group.

12. The method of claim 8 in which the treating material is an ether of polyethylene glycol and an aliphatic alcohol having 5 to 18 carbon atoms in the aliphatic group.

13. The method of claim 8 in which the treating material is an ether of polyethylene glycol and an alkylphenol having 8 to 18 carbon atoms in the alkyl group.

References Cited in the file of this patent

UNITED STATES PATENTS 2,664,367    Wilson _____ Dec. 29, 1953

OTHER REFERENCES

McClelland: India Rubber World, vol. 25, No. 5, pp. 579–581, February 1952.